United States Patent
Basso et al.

(10) Patent No.: US 9,178,814 B2
(45) Date of Patent: Nov. 3, 2015

(54) ANALYSIS OF NETWORK PACKETS USING A GENERATED HASH CODE

(71) Applicant: INTERNATIONAL BUSINESS MACHINES CORPORATION, Armonk, NY (US)

(72) Inventors: Claude Basso, Research Triangle Park, NC (US); Jean L. Calvignac, Raleigh, NC (US); Natarajan Vaidhyanathan, Research Triangle Park, NC (US); Fabrice Verplanken, LaGaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/687,248

(22) Filed: Nov. 28, 2012

(65) Prior Publication Data

US 2013/0156036 A1    Jun. 20, 2013

Related U.S. Application Data

(63) Continuation of application No. 13/325,597, filed on Dec. 14, 2011.

(51) Int. Cl.
| | |
|---|---|
| *H04L 12/28* | (2006.01) |
| *H04L 12/56* | (2006.01) |
| *H04L 12/741* | (2013.01) |
| *H04L 29/06* | (2006.01) |
| *H04L 1/00* | (2006.01) |
| *H04J 3/24* | (2006.01) |

(52) U.S. Cl.
CPC ............... *H04L 45/74* (2013.01); *H04L 69/22* (2013.01)

(58) Field of Classification Search
CPC ..... H04L 69/22; H04L 29/0653; H04L 69/04; H04L 45/74
USPC ................... 370/252, 419, 474, 392
See application file for complete search history.

(56) References Cited

U.S. PATENT DOCUMENTS

| | | | |
|---|---|---|---|
| 6,954,789 B2 | 10/2005 | Dietz et al. | |
| 7,669,234 B2 | 2/2010 | Buer | |
| 8,619,782 B2 | 12/2013 | Basso et al. | |
| 2008/0013541 A1* | 1/2008 | Calvignac et al. | 370/392 |
| 2008/0219176 A1* | 9/2008 | Yamada | 370/252 |
| 2009/0080452 A1* | 3/2009 | Ra et al. | 370/419 |
| 2010/0040067 A1 | 2/2010 | Hao et al. | |
| 2010/0153706 A1 | 6/2010 | Haddad | |
| 2010/0299515 A1 | 11/2010 | Michiels et al. | |
| 2011/0206064 A1* | 8/2011 | Head et al. | 370/474 |

OTHER PUBLICATIONS

U.S. Appl. No. 13/325,624 entitled "Transformation of Bi-Directional Packet Flow"; Notice of Allowance dated Jun. 25, 2013 (16 pg.).

(Continued)

*Primary Examiner* — Helal A Algahaim
*Assistant Examiner* — Mahmoud Ismail
(74) *Attorney, Agent, or Firm* — Russell Ng PLLC; Steven Bennett

(57) ABSTRACT

A technique for analyzing network packets includes receiving, by a network processor, a network packet having a packet header including address and control information. A set of bytes are extracted, using the network processor, from the packet header and a set of input bits for generating a hash code are derived, using the network processor, from the set of bytes. Finally, the hash code is generated using the input bits.

14 Claims, 2 Drawing Sheets

(56) References Cited

OTHER PUBLICATIONS

U.S. Appl. No. 13/912,235 entitled "Generation of a compacted binary identifier"; Non-final office action dated Jan. 3, 2014 (17 pg).

U.S. Appl. No. 13/325,553 entitled "Compacted Binary Identifier Generation"; Non-final office action dated Jul. 5, 2013 (19 pg.).

U.S. Appl. No. 13/325,553 entitled "Compacted Binary Identifier Generation"; final office action dated Feb. 4, 2014 (19 pg.).

Kang Li et al., "Architectures for Packet Classification Caching", ICON 2003, The 11th IEEE International Conference on Networks (IEEE Cat. No. 03EX671), 111-17, 2003.

U.S. Appl. No. 13/325,597 entitled "Analysis of Network Packets Using a Generated Hash Code"; final office action dated Oct. 2, 2013.

U.S. Appl. No. 13/325,597 entitled "Analysis of Network Packets Using a Generated Hash Code"; Non-final office action dated Apr. 10, 2013 (24 pg.).

U.S. Appl. No. 13/325,597 entitled "Analysis of Network Packets Using a Generated Hash Code"; Non-final office action dated Jan. 16, 2014.

* cited by examiner

ANALYSIS OF NETWORK PACKETS USING A GENERATED HASH CODE

This application is a continuation of U.S. patent application Ser. No. 13/325,597, entitled "ANALYSIS OF NETWORK PACKETS USING A GENERATED HASH CODE," by Claude Basso et al., filed Dec. 14, 2011, the disclosure of which is hereby incorporated herein by reference in its entirety for all purposes.

BACKGROUND

This disclosure relates generally to analysis of network packets and, more specifically, to analysis of network packets using a generated hash code.

A typical network packet includes a packet header that has a defined number of bytes. Analysis of a packet header has typically been required in order to assign a network packet to an appropriate packet flow (i.e., an appropriate receive or transmit queue). As analysis of an entire packet header may be time consuming, hash codes (which are usually short compared to entire packet headers) of packet headers have been utilized to reduce analysis time. Reducing the time required to identify a packet flow is even more desirable when multiple packet headers (i.e., a packet header of a lower layer network packet and a packet header of an upper layer network packet) have to be analyzed to identify a packet flow. In general, hash codes may have different lengths depending on processing requirements and, as such, flexibility in calculating hash functions is usually desirable. The usability of a hash code depends on the entropy of the generated hash code. In general, hash codes with higher entropy have higher information content and, as such, more accurately identify a packet flow of a network packet.

The flexibility of hash functions have typically been defined by two parameters: the way in which the hash key is assembled; and the properties of the hash function. Several trade-offs are often made to implement flexible hashers by playing on variations of the two properties. In general, flexibility in hash key assembly may be better achieved in software implementations of hashers, while flexible hash functions usually involve some form of configurable hardware hasher implementation. Each aspect of hasher flexibility typically comes with limitations. For example, software key assemblies have performance limitations when complex patterns are required to build the hash key (in particular, when the key assembly is done at bit-level granularity). As another example, configurable hardware hash functions have silicon area limitations due to the configuration logic implementing the base hashing elements, which are typically implemented with exclusive OR (XOR) gates. The limitations appear to be especially significant when a hasher is used for identifying packet flows on very high-speed interfaces (e.g., 10 Gbps or more), mainly due to very short packet periodicity (e.g., 67.2 ns or less).

SUMMARY

According to one aspect of the present disclosure, a technique for analyzing network packets includes receiving, by a network processor, a network packet having a packet header including address and control information. A set of bytes are extracted, using the network processor, from the packet header and a set of input bits for generating a hash code are derived, using the network processor, from the set of bytes. Finally, the hash code is generated using the input bits.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
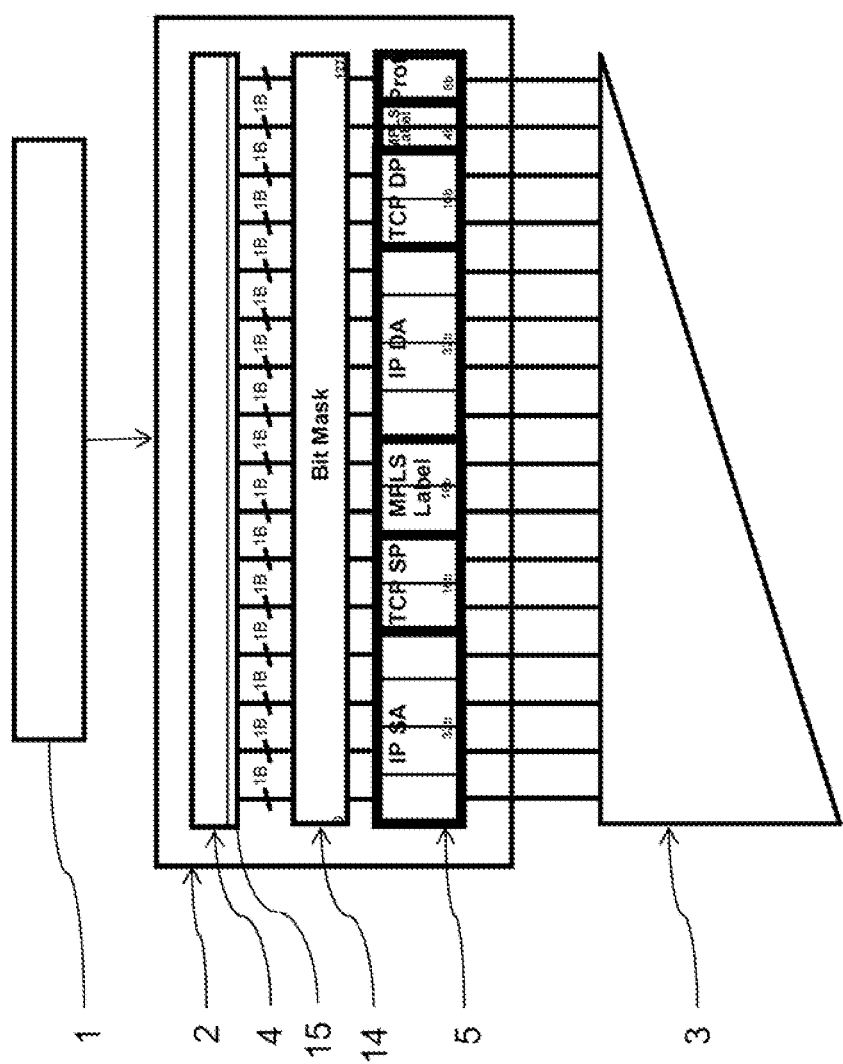
FIG. 1 is a diagram of a relevant portion of an exemplary hasher of a network processor configured according to various aspects of the present disclosure.

As will be appreciated by one of ordinary skill in the art, the present invention may be embodied as a method, system, device, or computer program product. Accordingly, the present invention may take the form of an embodiment including hardware, an embodiment including software (including firmware, resident software, microcode, etc.) or an embodiment combining software and hardware aspects that may all generally be referred to herein as a circuit, module, or system. The present invention may, for example, take the form of a computer program product on a computer-usable storage medium having computer-usable program code, e.g., in the form of one or more design files, embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium include: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. As used herein the term "coupled" includes a direct electrical connection between elements or blocks and an indirect electrical connection between elements or blocks achieved using one or more intervening elements or blocks.

According to various aspects of the present disclosure, a network processor for generating a hash code for analyzing network packets is configured to provide flexibility for the use of different length hash codes. In one or more embodiments, the network processor is configured for rapid computation of a hash code and corresponding identification of packet flows. According to the present disclosure, a packet header of a network packet includes address and control information that is received by a network processor. The network processor extracts a set of bytes from the packet header and derives (from the set of bytes) a set of input bits for generating a hash code.

In various embodiments, the network processor includes a packet parser and a hash code generator. The packet parser is configured to: receive a network packet having a packet header (including address and control information), extract a set of bytes from the packet header; and derive from the set of bytes a set of input bits for generating a hash code. The hash code generator is configured to generate a hash code using the input bits. In general, the hash code generator implements a single hash generating function that generates the hash code based on the input bits extracted from the bytes. Accordingly, without modifying the hash generating function, a resulting hash code can be adapted by selecting different bytes from a packet header. This facilitates generating a hash code having a high entropy, as input bits from the selected bytes usually have a high entropy.

The selection of bytes depends on the usage of a network processor within a network structure. For example, at a network destination, a destination address may be identical for certain network protocols. In this case, the destination address of the packet header does not usually provide useful information for determining the flow of the network packet, i.e., the entropy of the information is low. In contrast, in a network processor in an intermediate point of a network connection (e.g., a relay station), a source address and a destination address of a network packet are meaningful and can be used for hash code generation. An implementation in a network processor or a system for analyzing packets can be achieved by implementing a single hash code generator in silicon, so that only a relatively small silicon area is occupied for hash code generation. The flexibility in selecting the bytes can be easily implemented with relatively low computational effort, such that network packets can be adequately processed even when high data rates are required.

According to one or more embodiments, extracting a set of bytes from the packet header includes extracting bytes from a packet header transported within a network packet. For example, when transmission control protocol (TCP) packets are transported in Internet protocol (IP) packets the packet headers of both packets are utilized to generate a hash code. In this manner, the bytes can be selected from a bigger set of bytes. In another embodiment, a set of bytes extracted from a packet header may include one or more of: an Internet protocol (IP) source address; a transmission control protocol (TCP) source port; an multi-protocol label switching (MPLS) label; an IP destination address; a TCP destination port; a reserved area; and protocol information. In general, the extracted bytes identify the destination and the source of network packets and provide further header information (where the importance of each field depends on the kind of network device in which the network processor is used).

In the event that some of the packet header bytes are not meaningful, other packet header bytes that are meaningful can be used. Bytes from IP packet headers may include bytes from packet headers that conform to Internet Protocol version 4 (IPv4) or Internet Protocol version (IPv6), depending on which network protocol is implemented. According to one or more embodiments, extracting the IP source address and/or the IP destination address may include compressing the IP source address and/or the IP destination address. For example, when IP addresses are relatively long and the number of input bits of a hash code generating algorithm is relatively small, compression is desirable. Further details regarding compression of IPv6 addresses is available in U.S. patent application Ser. No. 13/325,553 entitled "COMPACTED BINARY IDENTIFIER GENERATION."

In one or more embodiments, a set of input bits is derived from a set of bytes. The set of input bits are then used to generate a hash code. In at least one embodiment, the bytes for forming the input bits are ordered from most meaningful to least meaningful. In this case, the entropy of the input bits decreases from one side of the input bits to the other. This facilitates classifying the bits derived from the bytes according to their importance so that properties of the hash code generation can be taken into account when arranging the input bits. According to one or more embodiments, deriving (from the set of bytes) a set of input bits for generating a hash code includes eliminating non-significant bits from the bytes.

Depending on the protocols used, bytes from the packet header may only include a certain number of meaningful bits by definition. In this case, the remaining non-meaningful bits of a byte may be filled with predefined values. It should be appreciated that non-specified bits do not have valuable information (i.e., their entropy is zero) for determining the flow of network packets and, as such, non-specified bits may be omitted in creating a hash code. For example, non-specified bits may be omitted using bit shifting, which requires minimal computational effort. Alternatively, non-specified bits may be set or maintained at 0, so that the non-specified bit have no effect in the cascade of XOR gates in a hasher combinatorial cone.

In at least one embodiment, a hash code is generated with the most meaningful bits arranged on one side of the hash code. In this embodiment, the entropy of the hash code decreases from one side of the hash code to the other. In this case, an entire generated hash code or a reduced number of bits from the generated hash code may be used to identify a flow for a network packet. As the most meaningful bits can be readily selected from a hash code, a single hash code generator can be used for different purposes. In one or more embodiments, input bits can be arranged in a particular manner, e.g., according to their entropy, so that the input bits can be processed (by the hash code generator) according to their importance. In one or more embodiments, input bits and output bits of a hash code generator are both arranged with the most important bits towards one side of the code.

Figure 2:
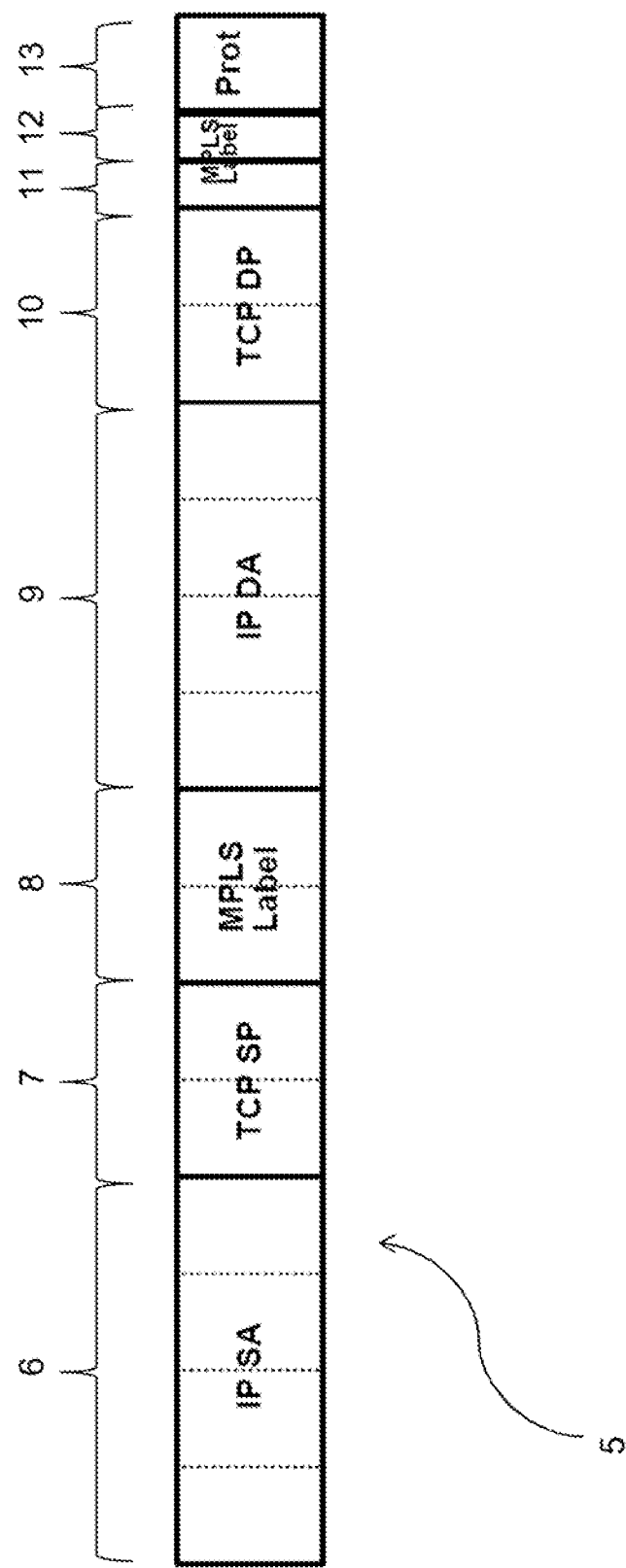
FIG. 2 is a diagram of content of an output register of a packet parser (which includes a set of bytes extracted from a network packet header) of the hasher of FIG. 1.

Referring to FIG. 1, relevant components of a hasher (of a network processor) that are used to generate a hash code are illustrated. A packet header 1 of a network packet is passed to the network processor. The network processor includes a packet parser 2 and a hash code generator (hasher combinatorial cone) 3 coupled to parser 2. Parser 2 includes a parser unit 4, a bit masking unit 14, and an output register 5. Parser unit 4 is configured to extract bytes from packet header 1. The bytes are predefined and depend on the use of the network processor. With reference to FIG. 2, a packet header included in output register 5 may be, for example, a packet header for an IP packet that includes a TCP packet. In this case, extracted bytes may correspond to an IP source address (IP SA) 6, a TCP source port (TCP SP) 7, a multi-protocol label switching (MPLS) label 8, 11, an IP destination address (IP DA) 9, a TCP destination port (TCP DP) 10, a reserved area 12, and a protocol byte (Prot) 13.

The bytes are passed from parser unit 4 to bit masking unit 14, which assembles meaningful bits from the bytes as input bits for hash code generator 3. The MPLS label (MPLS label 8, MPLS label 11, and reserved area 12,) includes twenty-four bits (four spare bits and twenty used bits). Bit masking unit 14 may, for example, replace the four meaningless (spare) bits with '0' and assemble the input bits accordingly. In one or more embodiments, parser unit 4 arranges the bytes extracted from packet header 1 according to their importance. For example, the bytes may be arranged as shown in FIG. 2 starting with IP source address 6 and followed by TCP source port 7, MPLS label 8, IP destination address 9, TCP destination port 10, MPLS label 11, reserved area 12, and protocol byte 13. In one or more embodiments, hash code generator 3 is configured to receive one-hundred twenty-eight input bits, as provided in output register 5. In various embodiments, hash code generator 3 implements a hash function that is a classical combinatorial cone of logic based on XOR gates that combines all 128-bits (i.e., the input bits) of output register 5 to produce a resulting 32-bit hash value.

In at least one embodiment, hash code generator 3 is implemented to provide the most meaningful output bits on the left side of the hash code, as indicated by the triangular form of hash code generator 3. Arrangement of the output bits is based on the respective arrangement of the input bits according to their importance. As such, the hash code can be (entirely or partially) utilized starting from the side of the most important bits to correctly identify a flow of a network packet. As mentioned above, depending on the circumstances, different pieces of information may have higher entropy for calculating the hash code. Accordingly, different scenarios can be implemented for assembling the input bits to hash code generator 3. Flexibility for key assembly is achieved through a distribution bus 15, which is provided as part of parser unit 4. Distribution bus 15 arranges bytes from packet header 1 (that are extracted within parser unit 4) for further processing. In one or more embodiments, distribution bus 15 is implemented as a pico-coded finite state machine (FSM). Distribution bus 15 facilitates assembling raw keys with any combinations of bytes extracted (by packet parser 2) from packet header 1.

For example, information available for key construction may include various scenarios, e.g., a 5-tuple format, a 3-tuple format, a 2-tuple format, a multiprotocol label switching (MPLS) 1 format, an MPLS 2 format, and a tunnelled IP-in-IP packet format. The designation and sizes of the various scenario are illustrated in the tables below:

| 5-Tuple: | | |
|---|---|---|
| SA | Source Address | 4 Bytes |
| SP | Source Port | 2 Bytes |
| DA | Destination Address | 4 Bytes |
| DP | Destination Port | 2 Bytes |
| Proto | Protocol | 1 Byte |

| 3-Tuple | | |
|---|---|---|
| DA | Destination Address | 4 Bytes |
| DP | Destination Port | 2 Bytes |
| Proto | Protocol | 1 Byte |

| 2-Tuple | | |
|---|---|---|
| DP | Destination Port | 2 Bytes |
| Proto | Protocol | 1 Byte |

| MPLS 1 | | |
|---|---|---|
| Label | | 2.5 Bytes |
| SA | Source Address | 4 Bytes |
| SP | Source Port | 2 Bytes |
| DA | Destination Address | 4 Bytes |
| DP | Destination Port | 2 Bytes |
| Proto | Protocol | 1 Byte |

| MPLS 2 | |
|---|---|
| Label | 2.5 Bytes |

| Tunnelled IP-in-IP packets | | |
|---|---|---|
| SA (1) | Inner packet Source Address | 4 Bytes |
| SP (1) | Inner packet Source Port | 2 Bytes |
| DA (1) | Inner packet Destination Address | 4 Bytes |
| DP (1) | Inner packet Destination Port | 2 Bytes |
| Proto (1) | Inner packet Protocol | 1 Byte |
| SA (2) | Outer packet Source Address | 4 Bytes |
| DA (2) | Outer packet Destination Address | 4 Bytes |

In the disclosed embodiments, bit masking unit 14 and output register 5 are implemented inside parser 2. It should be appreciated, however, that the functions provided by bit masking unit 14 and output register 5 can be provided independent, i.e., outside parser 2.

Accordingly, a network processor has been disclosed herein that advantageously analyzes network packets using a generated hash code to determine packet flow.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," (and similar terms, such as includes, including, has, having, etc.) are open-ended when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for analyzing network packets, comprising:
receiving, using a network processor, a network packet having a packet header including address and control information;
extracting, using the network processor, a set of bytes from the packet header, wherein the set of bytes to extract is selected based on a location of the network processor within a network structure;
deriving, using the network processor, from the set of bytes a set of input bits for generating a hash code; and
generating, using the network processor, the hash code using the input bits, wherein the hash code is utilized to identify a packet flow of the network packet, and wherein in response to the network processor being located at a first physical location in the network structure the network processor extracts a first set of bytes and in response to the network processor being located at a second physical location, different from the first physical location, in the network structure the network processor extracts a second set of bytes, different from the first set of bytes.

2. The method of claim 1, wherein the extracting, using the network processor, a set of bytes from the packet header includes extracting bytes from a packet header transported within the network packet.

3. The method of claim 1, wherein the extracting, using the network processor, a set of bytes from the packet header includes extracting an IP source address and an IP destination address from the packet header.

4. The method of claim 3, wherein the extracting an IP source address and an IP destination address from the packet header includes compressing the IP source address and the IP destination address.

5. The method of claim 1, wherein the deriving, using the network processor, from the set of bytes a set of input bits for generating a hash code includes ordering the bytes for forming the input bits from most meaningful to least meaningful.

6. The method of claim 1, wherein the deriving, using the network processor, from the set of bytes a set of input bits for generating a hash code includes replacing meaningless bits in the bytes.

7. The method of claim 1, wherein the generating, using the network processor, a hash code using the input bits includes generating a hash code with most meaningful bits arranged on one side of the hash code.

8. A network processor for analyzing network packets, comprising:
a packet parser, wherein the packet parser is configured to:
receive a network packet having a packet header that includes address and control information;
extract a set of bytes from the packet header, wherein the set of bytes to extract is selected based on a location of the network processor within a network structure; and
derive from the set of bytes a set of input bits for generating a hash code, wherein in response to the network processor being located at a first physical location in the network structure the packet parser extracts a first set of bytes and in response to the network processor being located at a second physical location, different from the first physical location, in the network structure the packet parser extracts a second set of bytes, different from the first set of bytes; and
a hash code generator coupled to the packet parser, wherein the hash code generator is configured to generate the hash code using the input bits, and wherein the hash code is utilized to identify a packet flow of the network packet.

9. The network processor of claim 8, wherein the packet header is transported within the network packet.

10. The network processor of claim 8, wherein the packet parser is further configured to extract an IP source address and an IP destination address from the packet header.

11. The network processor of claim 10, wherein the network processor is further configured to compress the IP source address and the IP destination address.

12. The network processor of claim 8, wherein packet parser is further configured to order the bytes for forming the input bits from most meaningful to less meaningful.

13. The network processor of claim 8, wherein the packet parser is further configured to replace meaningless bits in the bytes.

14. The network processor of claim 8, wherein the hash code generator generates the hash code with most meaningful bits arranged on one side of the hash code.

* * * * *